(12) United States Patent
Abe

(10) Patent No.: US 10,809,763 B2
(45) Date of Patent: Oct. 20, 2020

(54) CHASSIS AND ELECTRONIC DEVICE

(71) Applicant: FUJITSU CLIENT COMPUTING LIMITED, Kanagawa (JP)

(72) Inventor: Takashi Abe, Kawasaki (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 0 days.

(21) Appl. No.: 16/408,630

(22) Filed: May 10, 2019

(65) Prior Publication Data
US 2020/0150719 A1    May 14, 2020

(30) Foreign Application Priority Data
Nov. 14, 2018 (JP) .................................. 2018-213503

(51) Int. Cl.
*G06F 1/16* (2006.01)
*H01Q 1/22* (2006.01)

(52) U.S. Cl.
CPC .......... *G06F 1/1616* (2013.01); *G06F 1/1633* (2013.01); *H01Q 1/2266* (2013.01)

(58) Field of Classification Search
CPC ...... G06F 1/1618; G06F 1/162; G06F 1/1698; H01Q 1/2266
USPC ........................................ 361/679.06, 679.27
See application file for complete search history.

(56) References Cited

U.S. PATENT DOCUMENTS 8,675,373 B2 *   3/2014  Kinjou  .................. H01Q 1/2266
                                                      361/679.01
9,176,524 B2 *  11/2015  Kitamura  .............. G06F 1/1637
9,354,662 B2 *   5/2016  Ohishi  .................. G06F 1/1637
9,383,779 B2 *   7/2016  Abe  ...................... G06F 1/1643
2007/0293005 A1 * 12/2007  Shigenobu  ............ G06F 1/1656
                                                      438/238
2011/0013347 A1 *  1/2011  Kinjou  .................. G06F 1/1616
                                                      361/679.01

(Continued)

FOREIGN PATENT DOCUMENTS

JP     H08-072091 A      3/1996
JP     2012-000810 A     1/2012

(Continued)

OTHER PUBLICATIONS

Notification of Reasons for Refusal issued in corresponding Japanese Patent Application No. 2018-213503 dated Dec. 25, 2018 (6 pages).

(Continued)

*Primary Examiner* — Anthony Q Edwards
(74) *Attorney, Agent, or Firm* — Osha Liang LLP

(57) ABSTRACT

A chassis for an electronic includes: an outer wall having a first end; a rib that projects into the chassis from a position away from the first end of the outer wall in a first direction, and that extends along the first end; a first member made of a first material, including a first part that forms a part of the outer wall and a third part that forms a part of the rib; and a second member made of a second material different from the first material and joined to the first member. The second member includes a second part that forms a part of the outer wall and is aligned with the first part in the first direction, and a fourth part that forms a part of the rib and is aligned with the third part in the first direction.

5 Claims, 13 Drawing Sheets

(56) References Cited

U.S. PATENT DOCUMENTS

| | | | |
|---|---|---|---|
| 2011/0115735 A1* | 5/2011 | Lev | H01Q 1/243 |
| | | | 345/173 |
| 2011/0157788 A1* | 6/2011 | Yanagida | G06F 1/1616 |
| | | | 361/679.01 |
| 2015/0062808 A1* | 3/2015 | Abe | G06F 1/1643 |
| | | | 361/679.55 |
| 2015/0171504 A1* | 6/2015 | Hotta | H01Q 1/2266 |
| | | | 343/702 |
| 2017/0220066 A1* | 8/2017 | Ohishi | G06F 1/1618 |
| 2019/0220067 A1* | 7/2019 | Sugiura | H01Q 21/28 |
| 2019/0302856 A1* | 10/2019 | Li | G06F 1/1656 |
| 2020/0194870 A1* | 6/2020 | Yamamoto | H01Q 1/2266 |
| 2020/0194891 A1* | 6/2020 | Matsuoka | H01Q 1/24 |

FOREIGN PATENT DOCUMENTS

| | | |
|---|---|---|
| JP | 2012-038267 A | 2/2012 |
| JP | 2017-126602 A | 7/2017 |

OTHER PUBLICATIONS

Decision to Grant a Patent issued in corresponding Japanese Patent Application No. 2018-213503 dated Mar. 12, 2019 (4 pages).

\* cited by examiner

US 10,809,763 B2

CHASSIS AND ELECTRONIC DEVICE

CROSS-REFERENCE TO RELATED APPLICATIONS

This application is based upon and claims the benefit of priority from Japanese Patent Application No. 2018-213503, filed Nov. 14, 2018, the entire contents of which are incorporated herein by reference.

FIELD

Embodiments described herein relate generally to a chassis and an electronic device.

BACKGROUND

A chassis for an electronic device is known, which includes a first member and a second member made of mutually different materials and integrated together by insert molding.

SUMMARY

It is useful to attain, for example, such a chassis for an electronic device with a novel structure that includes the first member and the second member having an enhanced joint strength at the boundary.

It is beneficial to provide a chassis for an electronic device with a novel structure that includes a first member and a second member made of mutually different materials and having an enhanced joint strength at the boundary, as well as an electronic device including such a chassis.

One aspect of this disclosure is exemplified by the following device.

A chassis for an electronic device includes an outer wall having a first end; a rib that projects into the chassis from a position away from the first end of the outer wall in a first direction, and extends along the first end; a first member made of a first material, the first member including a first part that forms a part of the outer wall, and a third part that forms a part of the rib; and a second member made of a second material different from the first material and joined to the first member, the second member including a second part that forms a part of the outer wall and is aligned with the first part in the first direction, and a fourth part that forms a part of the rib and is aligned with the third part in the first direction.

DETAILED DESCRIPTION

Figure 1:
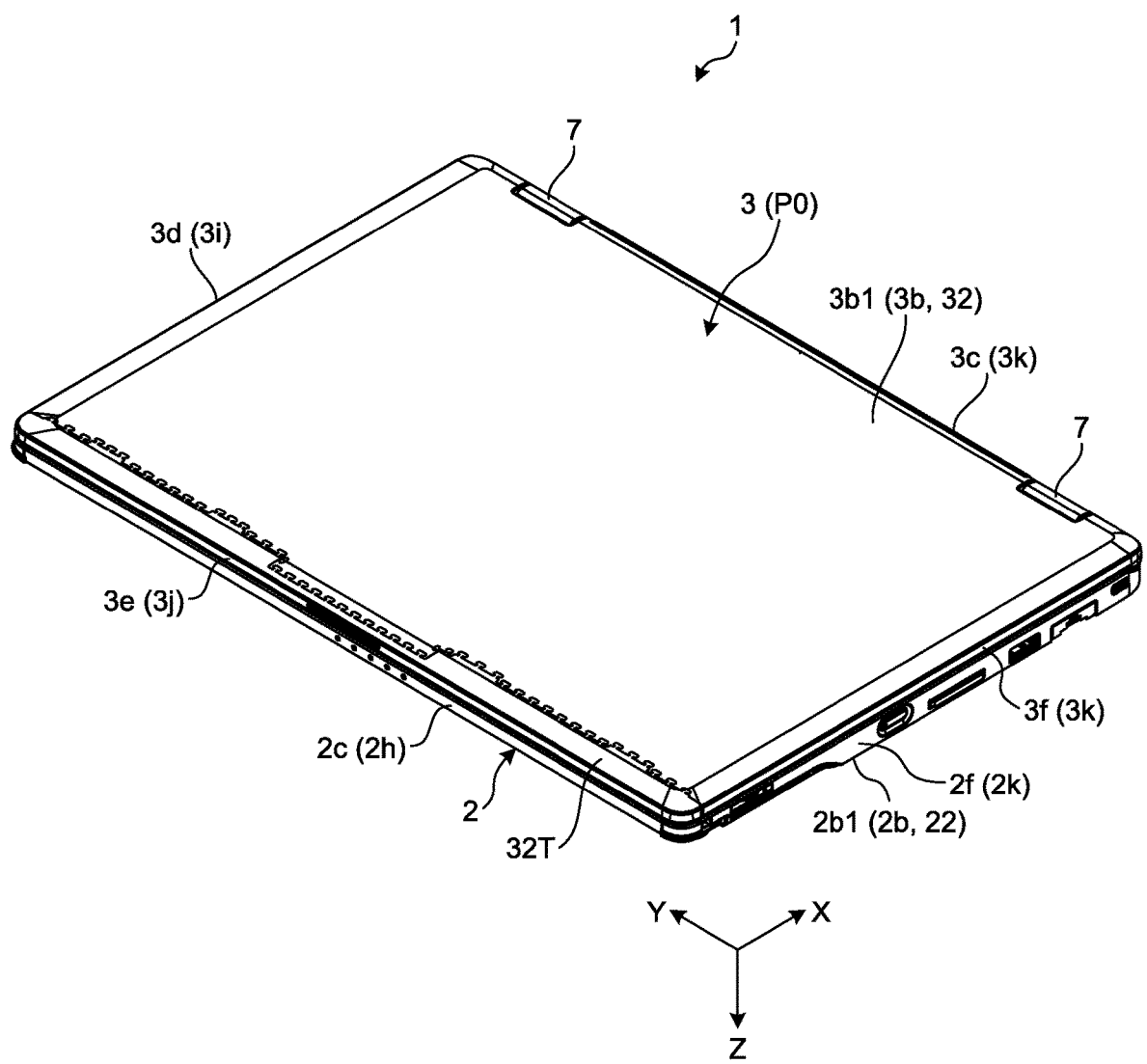
FIG. 1 is an exemplary perspective view of the front side of an electronic device according to one or more embodiments, when a display chassis is located at a closed position.

Hereinafter, exemplary embodiments and exemplary modifications of one or more embodiments this disclosure will be disclosed. Configurations of one or more embodiments and modifications described hereinafter, and the functions and effects attained by the configurations are merely exemplary. Embodiments and modifications can also be achieved by configurations other than the configurations described in the following embodiments and modifications. Embodiments and modifications can attain at least one of various effects (including derivative effects) attained by the configurations above.

The following embodiments and modifications include similar or same elements. In the following, similar or same elements are denoted by common reference numerals, and redundant descriptions are omitted. In this disclosure, ordinal numbers are used for discriminating parts, members, regions, positions, directions, and the like, and are not intended to indicate order or priority.

Figure 2:
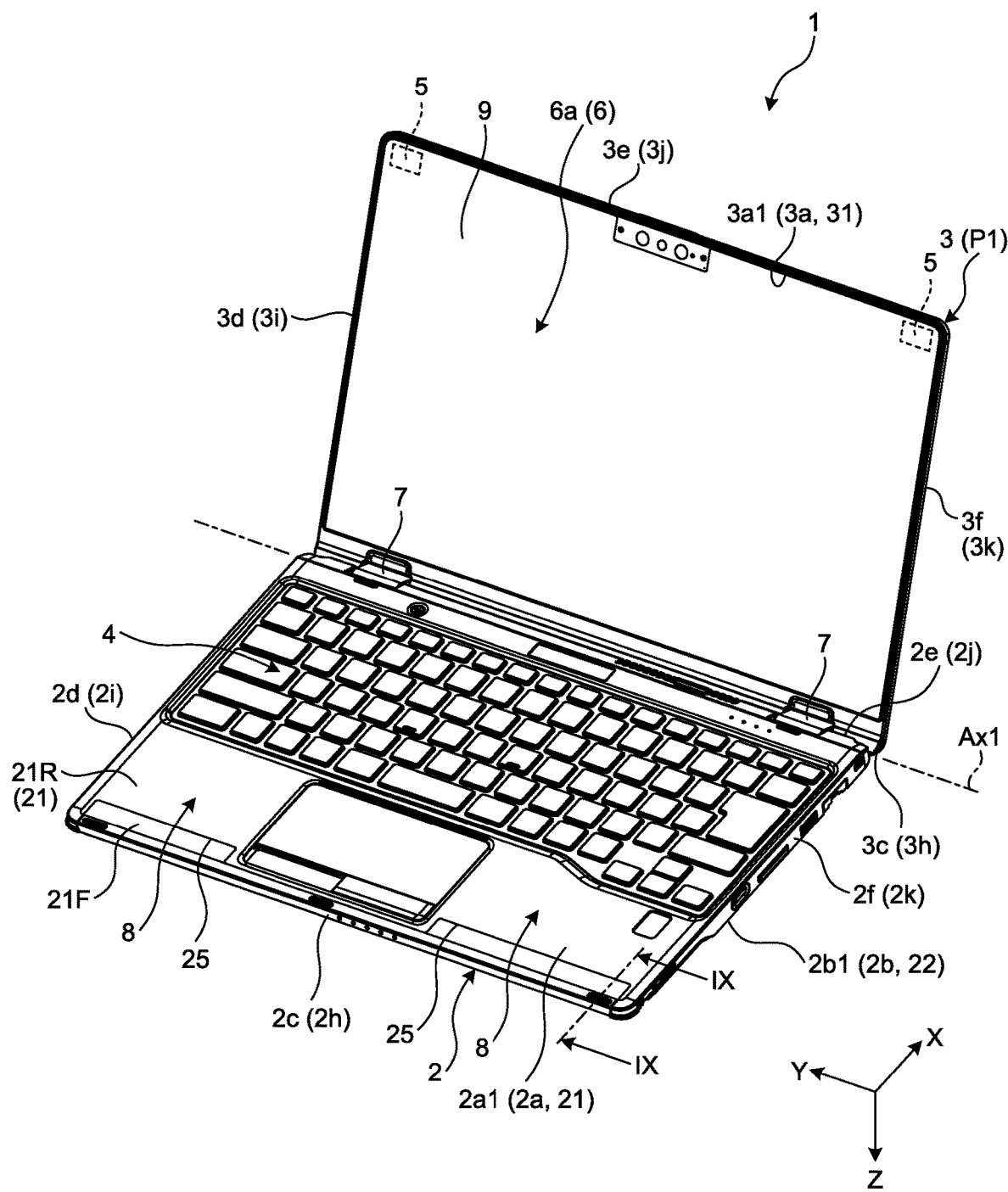
FIG. 2 is an exemplary perspective view of the front side of the electronic device according to one or more embodiments, when the display chassis is located at a first deployed position.

FIG. 1 is a perspective view of the front side of an electronic device 1 when a display chassis 3 is located at a closed position P0. FIG. 2 is a perspective view of the front side of the electronic device 1 when the display chassis 3 is located at a first deployed position P1. In the following, three directions orthogonal to each other are defined for the sake of convenience. X direction is along the depth (fore-aft direction) of a base chassis 2, Y direction is along the width (lateral direction, longitudinal direction) of the base chassis 2, and Z direction is along the thickness (vertical direction) of the base chassis 2. The X direction is an exemplary first direction, and the Z direction is an exemplary second direction. Hereinafter, the X direction may also be referred to as rearward, and a direction opposite to the X direction may be referred to as frontward. The Y direction may also be referred to as leftward, and a direction opposite to the Y direction may be referred to as rightward. The Z direction may be also referred to as downward, and a direction opposite to the Z direction may be referred to as upward.

As illustrated in FIGS. 1 and 2, the electronic device 1 represents, for example, a clamshell (notebook) personal computer, and includes the base chassis 2 and the display chassis 3. The base chassis 2 houses a keyboard 4 and a board (not illustrated). The display chassis 3 houses antenna units 5 and a display unit 6. The base chassis 2 is an exemplary chassis or first chassis, and the display chassis 3 is an exemplary second chassis. The electronic device 1 is not limited to this example, and can be, for example, configured as various types of electronic device 1 including the antenna unit 5, such as a desktop personal computer, a graphic display device, a television receiver, a game machine, a graphic display controller, or an information storage device.

The base chassis 2 includes, for example, a top face 2a1 to which the keyboard 4 is exposed, and a bottom face 2b1 facing in a direction opposite to the top face 2a1. The keyboard 4 is supported by the base chassis 2 to be operable from above. The base chassis 2 includes a board on which a plurality of electronic components such as a central processing unit (CPU), a read only memory (ROM), and a random access memory (RAM) is mounted. Wiring in the board and these electronic components constitute at least part of the control circuit of the electronic device 1.

The display chassis 3 includes, for example, a front face 3a1 to which a display screen 6a of the display unit 6 is exposed, and a rear face 3b1 facing in a direction opposite to the front face 3a1. The display unit 6 is supported by the display chassis 3 such that the display screen 6a is viewable from the front side. The front face 3a1 and the display screen 6a are covered with the transparent part of a touch panel 9.

The antenna units 5 are, for example, placed in two corners of a top end 3j of the display chassis 3. The antenna units 5 are electrically connected to a communication chip of the board via cables. Each of the antenna units 5 is an exemplary diversity antenna. According to one or more embodiments, as to the same radio signals received by the antenna units 5, the signal received by one of the antenna units 5 in a better radio wave condition is preferentially used, or the received signals are combined and subjected to noise removal, thereby improving communication quality and reliability. The antenna units 5 are not limited to this example, and may be, for example, placed in one corner alone.

Figure 3:
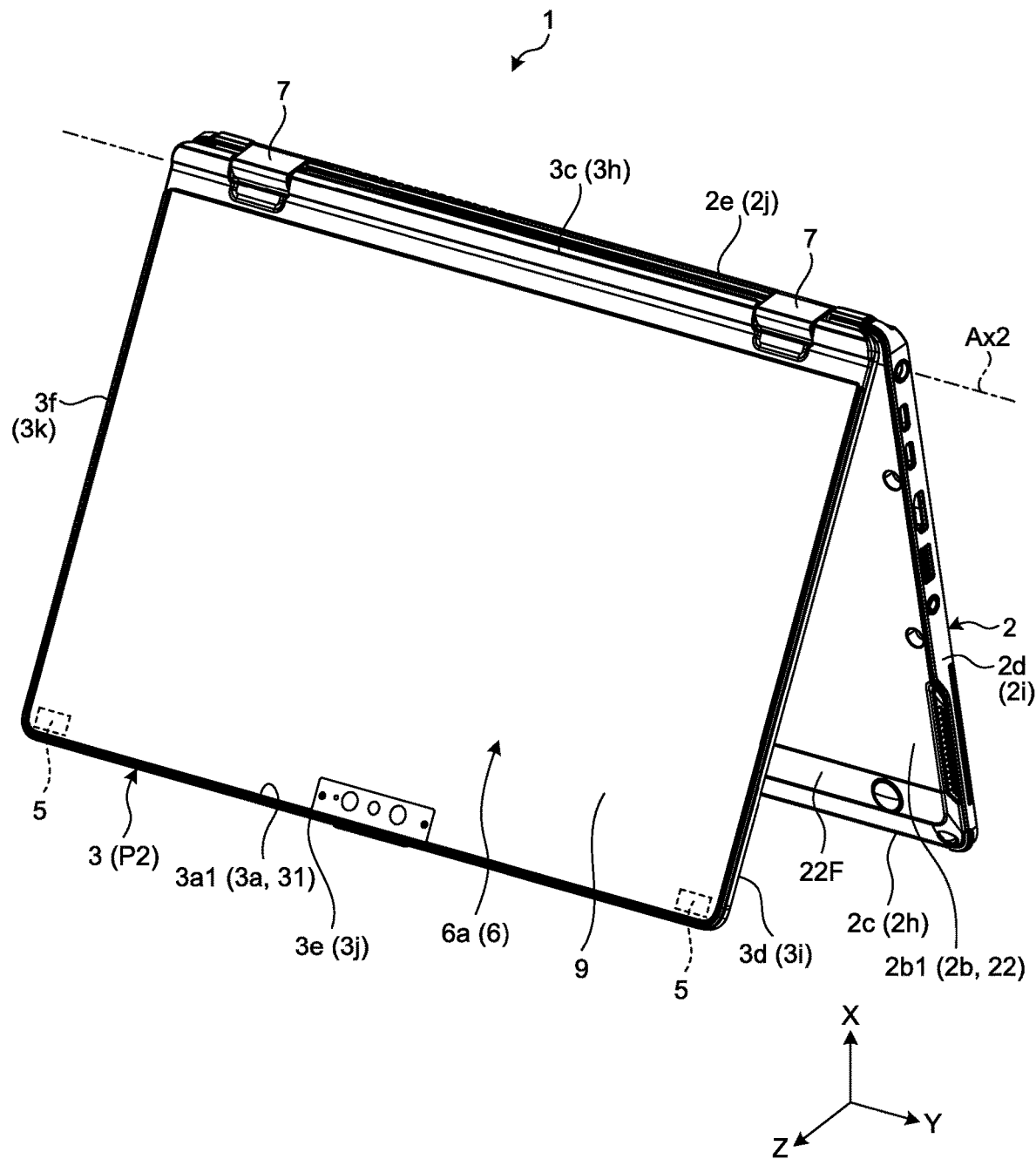
FIG. 3 is an exemplary perspective view of the back side the electronic device according to one or more embodiments when the display chassis is located at a second deployed position.
Figure 4:
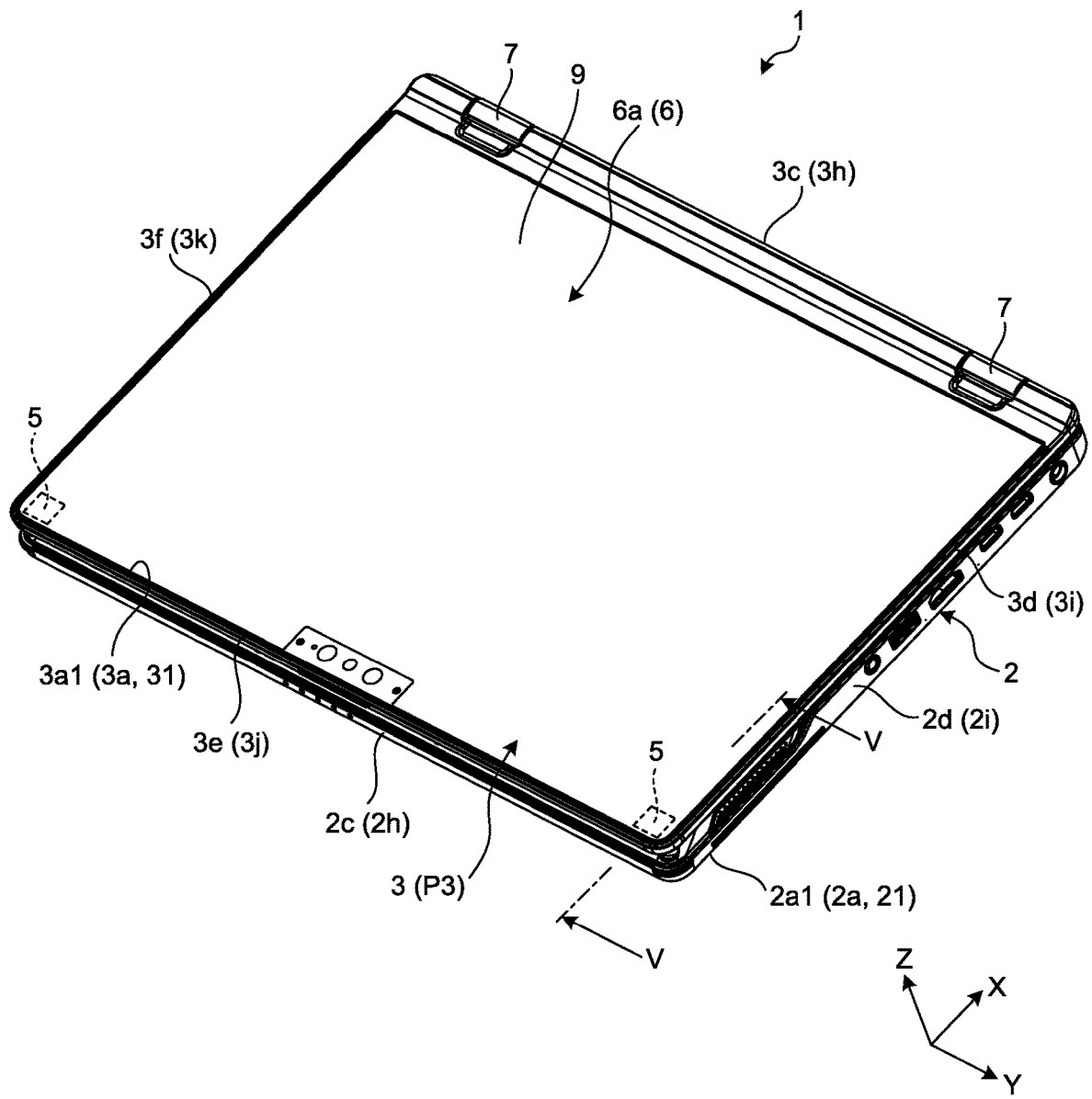
FIG. 4 is an exemplary perspective view of the back side of the electronic device according to one or more embodiments when the display chassis is located at a third deployed position.

FIG. 3 is a perspective view of the back side of the electronic device 1 when the display chassis 3 is located at a second deployed position P2. FIG. 4 is a perspective view of the back side of the electronic device 1 when the display chassis 3 is located at a third deployed position P3. In one or more embodiments, the electronic device 1 is usable in multiple modes including a notebook mode illustrated in FIG. 2, a tent mode (stand mode) illustrated in FIG. 3, and a slate mode (tablet mode) illustrated in FIG. 4.

To be more specific, the display chassis 3 is rotatably supported by the base chassis 2 by way of hinges 7 having two rotational centers (rotational axes) Ax1 and Ax2 and extending in the Y direction. The display chassis 3 is movable among the closed position P0 (FIG. 1), the first deployed position P1 (FIG. 2), the second deployed position P2 (FIG. 3), and the third deployed position P3 (FIG. 4) while rotating about the rotational centers Ax1 and Ax2 of the hinges 7.

As illustrated in FIG. 1, while the display chassis 3 is located at the closed position P0, the top face 2a1 of the base chassis 2 and the keyboard 4 oppose the front face 3a1 of the display chassis 3 and the display screen 6a of the display unit 6. Thus, at the closed position P0, the keyboard 4 and the touch panel 9 are hidden by the base chassis 2 and the display chassis 3, therefore, they are inoperable. The closed position P0 is an exemplary first position, and the top face 2a1 is an exemplary outer face. The closed position P0 is also referred to as an initial position or a first folded position.

As illustrated in FIG. 2, while the display chassis 3 is located at the first deployed position P1, the top face 2a1 and the keyboard 4 do not oppose the front face 3a1 and the display screen 6a, and the top face 2a1, the keyboard 4, the front face 3a1, and the display screen 6a are exposed. At the first deployed position P1, the rotational angle of the display chassis 3 with respect to the base chassis 2 is set to from 90 to 170 degrees, for example. At the first development position P1, the electronic device 1 is used in notebook mode, and operated through the keyboard 4 while the base chassis 2 is placed on a mount, such as a desk or a stand (not illustrated). The first deployed position P1 is also referred to as a first use position.

As illustrated in FIG. 3, while the display chassis 3 is located at the second deployed position P2, the top face 2a1 and the keyboard 4, and the front face 3a1 and the display screen 6a are oriented in opposite directions. At the second deployed position P2, the rotational angle of the display chassis 3 with respect to the base chassis 2 is set to from 270 to 350 degrees, for example. At the second deployed position P2, the electronic device 1 is used in tent mode (stand mode), and operated through the touch panel 9 while the base chassis 2 and the display chassis 3 stand on a mount (not illustrated). The second deployed position P2 is also referred to as a second use position.

As illustrated in FIG. 4, while the display chassis 3 is located at the third deployed position P3, the top face 2a1 and the keyboard 4 face oppositely to the front face 3a1 and the display screen 6a. At the third deployed position P3, the rotational angle of the display chassis 3 with respect to the base chassis 2 is 360 degrees. At the third deployed position P3, the electronic device 1 is used in slate mode (tablet mode), and operated through the touch panel 9 while the base chassis 2 is placed on a mount (not illustrated) or lifted from the mount. The third deployed position P3 is an exemplary second position.

The third deployed position P3 is not limited to this example. For example, the display chassis 3 may be placed on the top face 2a1 of the base chassis 2 with hinges having two rotational centers mutually intersecting (orthogonal to each other) so that display screen 6a of the display chassis 3 and the top face 2a1 face in opposite directions. The third deployed position P3 is also referred to as a third use position or a second folded position.

As illustrated in FIGS. 1 to 4, the display chassis 3 has, for example, a flat rectangular parallelepiped shape in one direction (Z direction in FIG. 1). The display chassis 3 includes a front wall 3a, a rear wall 3b, and a plurality of side walls 3c to 3f. The front wall 3a includes the front face 3a1, and the rear wall 3b includes the rear face 3b1. The front wall 3a has a quadrangular frame shape, and the rear wall 3b has a quadrangular plate shape.

As illustrated in FIG. 2, the side wall 3c and the side wall 3e form a bottom end 3h and the top end 3j of the display chassis 3, respectively. The bottom end 3h is adjacent to or in the vicinity of the rotational centers Ax1 and Ax2 of the hinges 7. The top end 3j is further from the rotational centers Ax1 and Ax2 of the hinges 7 than the bottom end 3h. The side wall 3d and the side wall 3f form a left end 3i and a right end 3k of the display chassis 3, respectively.

The display chassis 3 includes a combination of a plurality of parts (divided elements). Specifically, the display chassis 3 includes, for example, a front cover 31 and a rear cover 32. The front cover 31 includes the front wall 3a and part of each of the side walls 3c to 3f. The rear cover 32 includes the rear wall 3b and part of each of the side walls 3c to 3f. The front cover 31 and the rear cover 32 are joined together with pawls or screws, for example.

As illustrated in FIGS. 1 to 4, the base chassis 2 has, for example, a flat rectangular-parallelepiped box shape in the Z direction. The base chassis 2 includes a plurality of walls such as a top wall 2a, a bottom wall 2b, a front wall 2c, a left wall 2d, a rear wall 2e, and a right wall 2f. The front wall 2c, the left wall 2d, the rear wall 2e, and the right wall 2f are also referred to as sidewalls, peripheral walls, or end walls.

The top wall 2a and the bottom wall 2b both extend in a direction orthogonal to the Z direction (along an XY plane), and are placed in parallel to each other with spacing in the Z direction. The top wall 2a includes the top face 2a1, and the bottom wall 2b includes the bottom face 2b1. The bottom face 2b1 is provided with a plurality of supports that supports the base chassis 2 away from the mount (not illustrated). The supports are also referred to as legs or rubber legs. The top wall 2a is an exemplary outer wall.

The front wall 2c and the rear wall 2e both extend in a direction orthogonal to the X direction (along a YZ plane), and are placed in parallel to each other with spacing in the X direction. The front wall 2c extends between the ends of the top wall 2a and the bottom wall 2b in a direction opposite to the X direction. The rear wall 2e extends between the X-directional ends of the top wall 2a and the bottom wall 2b.

The front wall 2c and the rear wall 2e form a front end 2h and a rear end 2j of the base chassis 2, respectively. The front end 2h is apart from the rotational centers Ax1 and Ax2 of the hinges 7. The rear end 2j is more adjacent to or closer to the rotational centers Ax1 and Ax2 of the hinges 7 than the front end 2h. The front end 2h is an exemplary first end.

The left wall 2d and the right wall 2f extend in a direction orthogonal to the Y direction (along the XY plane), and are placed in parallel to each other with spacing in the Y direction. The left wall 2d extends between the Y-directional ends of the top wall 2a and the bottom wall 2b, and the right wall 2f extends between the ends of the top wall 2a and the bottom wall 2b in a direction opposite to the Y direction. The left wall 2d and the right wall 2f form a left end 2i and a right end 2k of the base chassis 2, respectively.

The base chassis 2 includes a combination of a plurality of parts (divided elements). To be more specific, the base chassis 2 includes, for example, a top cover 21 and a bottom cover 22. The top cover 21 includes the top wall 2a, and part of each of the front wall 2c, the left wall 2d, the rear wall 2e, and the right wall 2f. The bottom cover 22 includes the bottom wall 2b and part of each of the front wall 2c, the left wall 2d, the rear wall 2e, and the right wall 2f. The top cover 21 and the bottom cover 22 are joined together with pawls or screws, for example.

Figure 5:
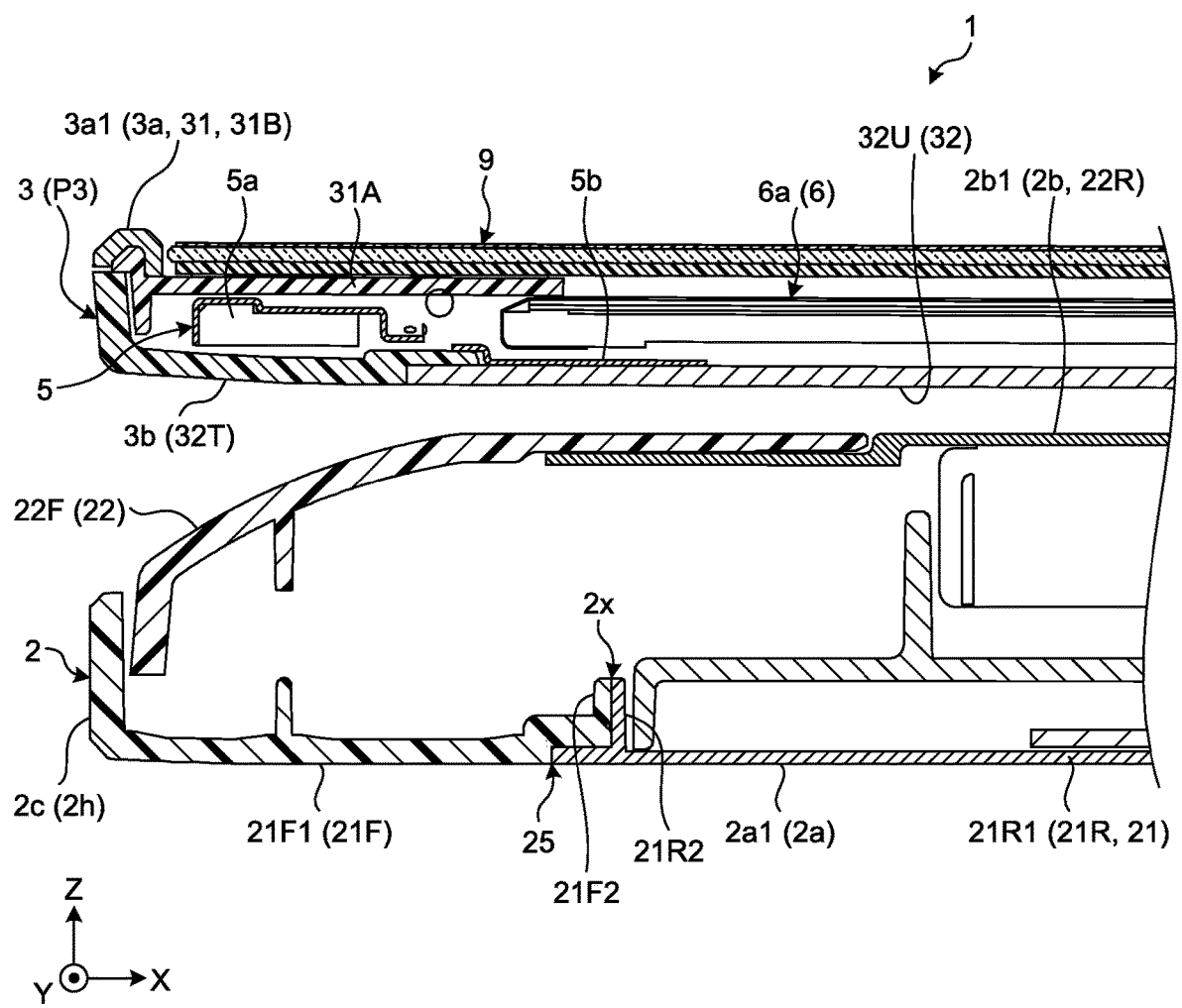
FIG. 5 is a cross-sectional view of the electronic device taken along a line V-V in FIG. 4.

FIG. 5 is a cross-sectional view of the electronic device 1 taken along a line V-V in FIG. 4. As illustrated in FIG. 5, the front cover 31 of the display chassis 3 includes a first member 31A and a second member 31B, and the rear cover 32 of the display chassis 3 includes a first member 32T and a second member 32U. The first members 31A, 32T and the second members 31B, 32U are made of materials different from each other. The first members 31A, 32T are made of a first material being a synthetic resin material while the second members 31B, 32U are made of a second material being a metallic material such as a magnesium alloy material. The first member 31A (32T) and the second member 31B (32U) are, for example, manufactured by insert molding or hybrid molding and joined together or integrated with each other.

The first members 31A, 32T are juxtaposed to an antenna 5a of the antenna unit 5 along the thickness of the display chassis 3 (in the Z direction in FIG. 5). Since the first members 31A, 32T are made of a synthetic resin material, the antenna 5a can transmit and receive radio waves via the first members 31A, 32T. The antenna 5a is, for example, intended for a wireless local area network (LAN). The antennas 5a may be other antennas unintended for the wireless LAN. The antenna 5a is made of a metallic material.

The antenna unit 5 includes a connection member 5b. The connection member 5b has a plate shape having a plurality of bends, and extends from the antenna 5a. The connection member 5b is made of a metallic material. The connection member 5b is fixed to the second member 32U with, for example, an aluminum tape, in contact with the inner surface of the second member 32U of the rear cover 32. That is, the antenna 5a and the second member 32U are electrically connected to each other via the connection member 5b. The second member 32U functions as a ground of the antenna 5a.

As illustrated in FIG. 5, the top cover 21 of the base chassis 2 includes a first member 21F and a second member 21R, and the bottom cover 22 of the base chassis 2 includes a first member 22F and a second member 22R. The first member 21F (22F) and the second member 21R (22R) are made of different materials from each other. The first members 21F, 22F are formed of a first material as a synthetic resin material while the second members 21R, 22R are formed of a second material as a metallic material such as a magnesium alloy material. The first member 21F (22F) and the second member 21R (22R) are manufactured by, for example, insert molding or hybrid molding and joined together or integrated with each other.

The first member 21F (22F) and the second member 21R (22R) are aligned in the X direction. That is, the second member 21R (22R) is farther from the front end 2h than the first member 21F (22F) is. In one or more embodiments, the first members 21F, 22F are aligned with the antenna 5a in the Z direction while the display chassis 3 is located at the third deployed position P3. Thereby, during use of the electronic device 1 with the display chassis 3 situated at the third deployed position P3, the antenna 5a can transmit and receive radio waves via the first members 21F, 22F made of a synthetic resin material.

As illustrated in FIG. 5, in one or more embodiments, the first member 21F and the second member 21R are provided with a rib 2x at their boundary 25. The rib 2x projects from the top wall 2a into the base chassis 2 in the Z direction, and extends along the front end 2h in the Y direction. The rib 2x includes a third part 21F2 of the first member 21F and a fourth part 21R2 of the second member 21R which are juxtaposed to each other in the X direction, as described later.

Figure 6:
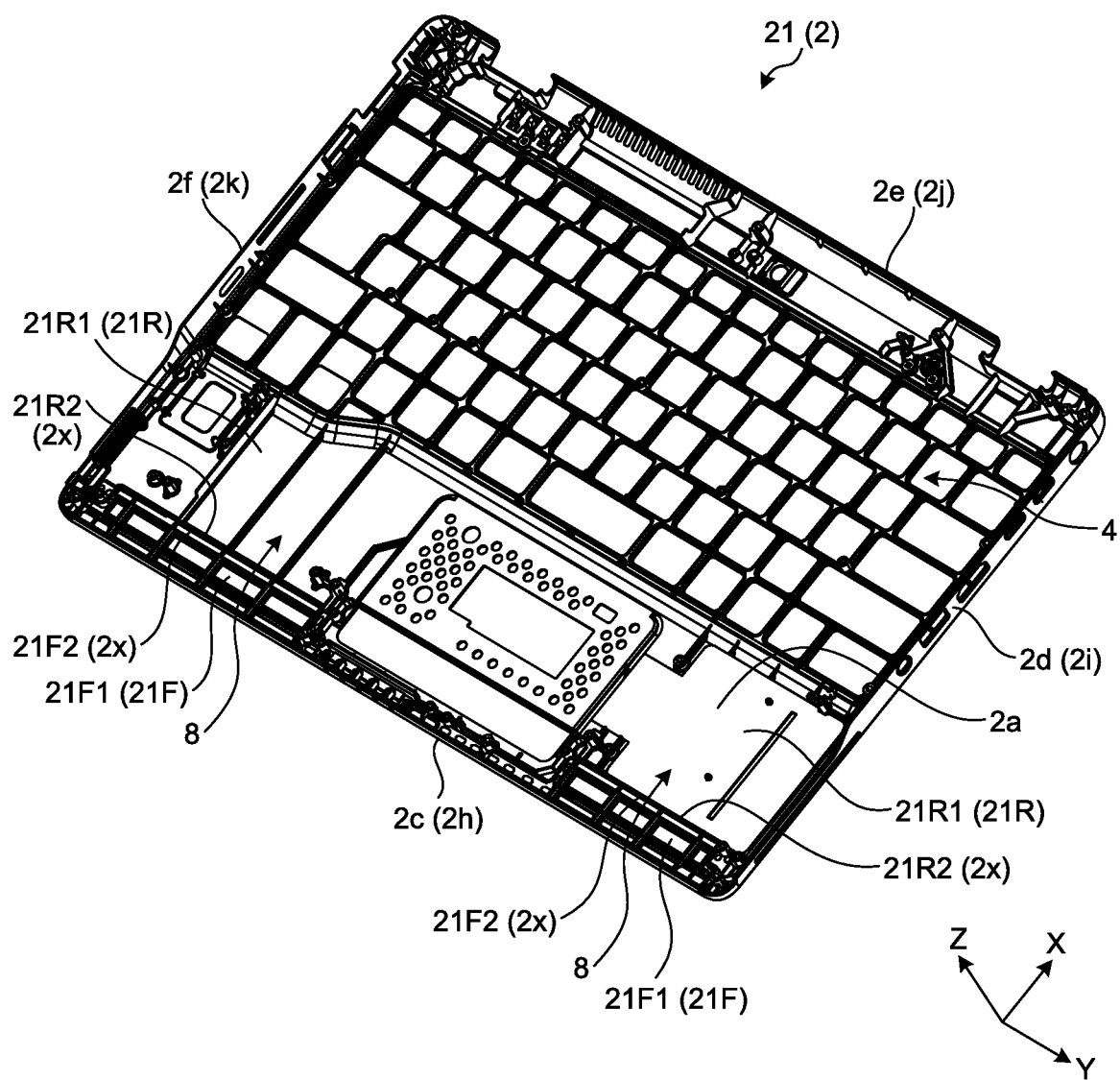
FIG. 6 is an exemplary perspective view of the back side of a top cover of the electronic device according to one or more embodiments.
Figure 7:
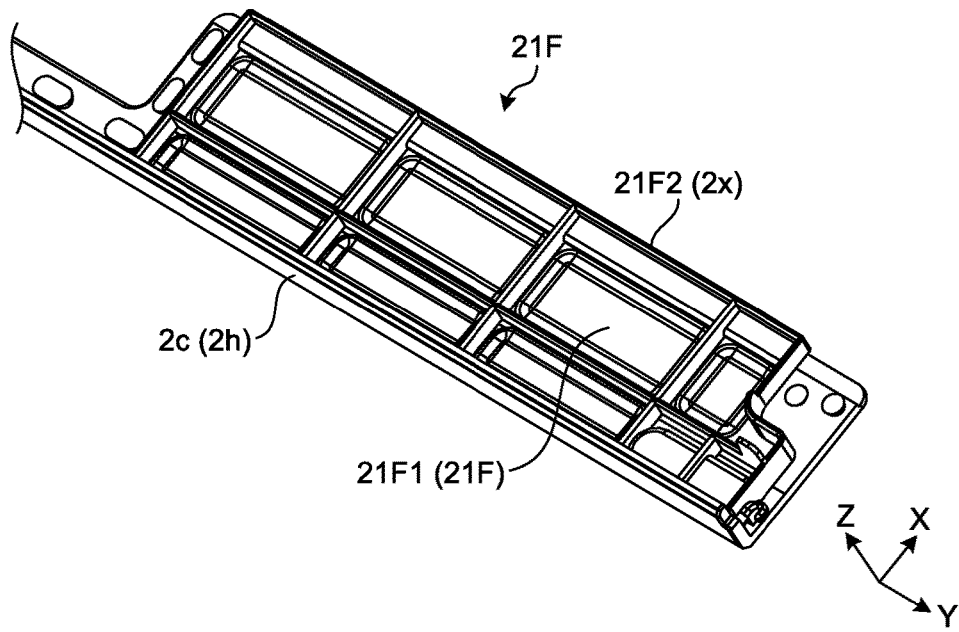
FIG. 7 is an enlarged view of part of a first member in FIG. 6.
Figure 8:
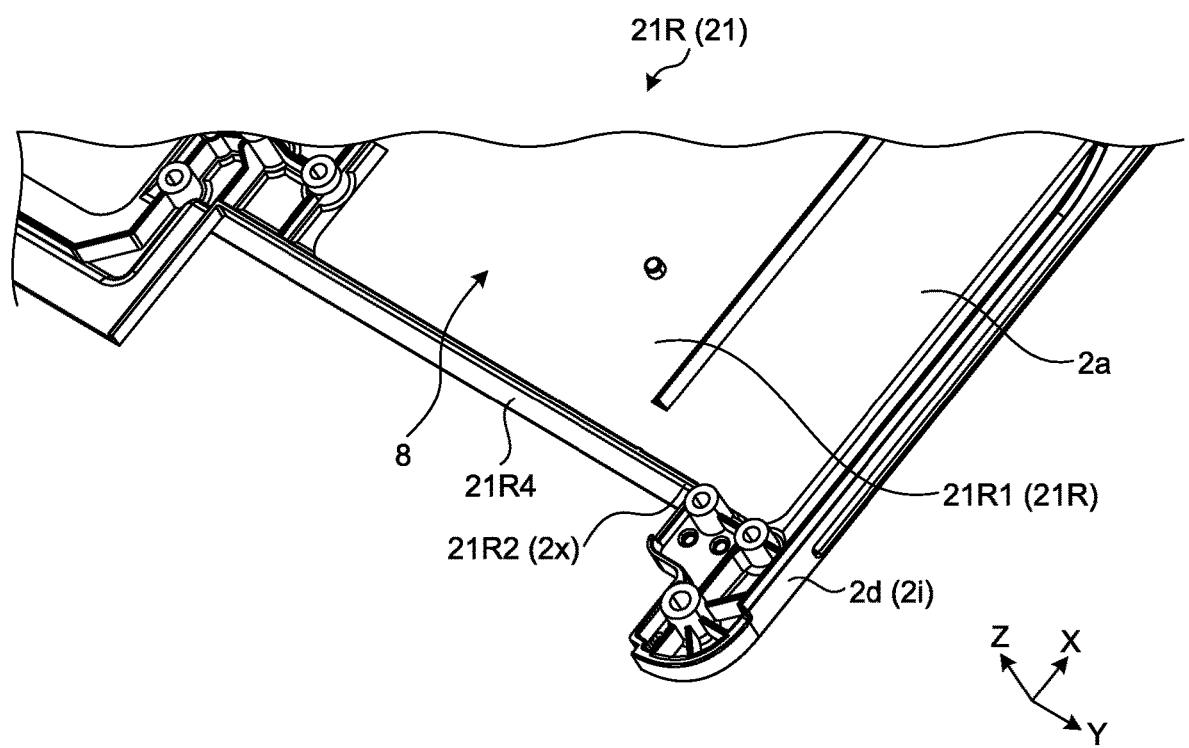
FIG. 8 is an enlarged view of part of a second member in FIG. 6.
Figure 9:
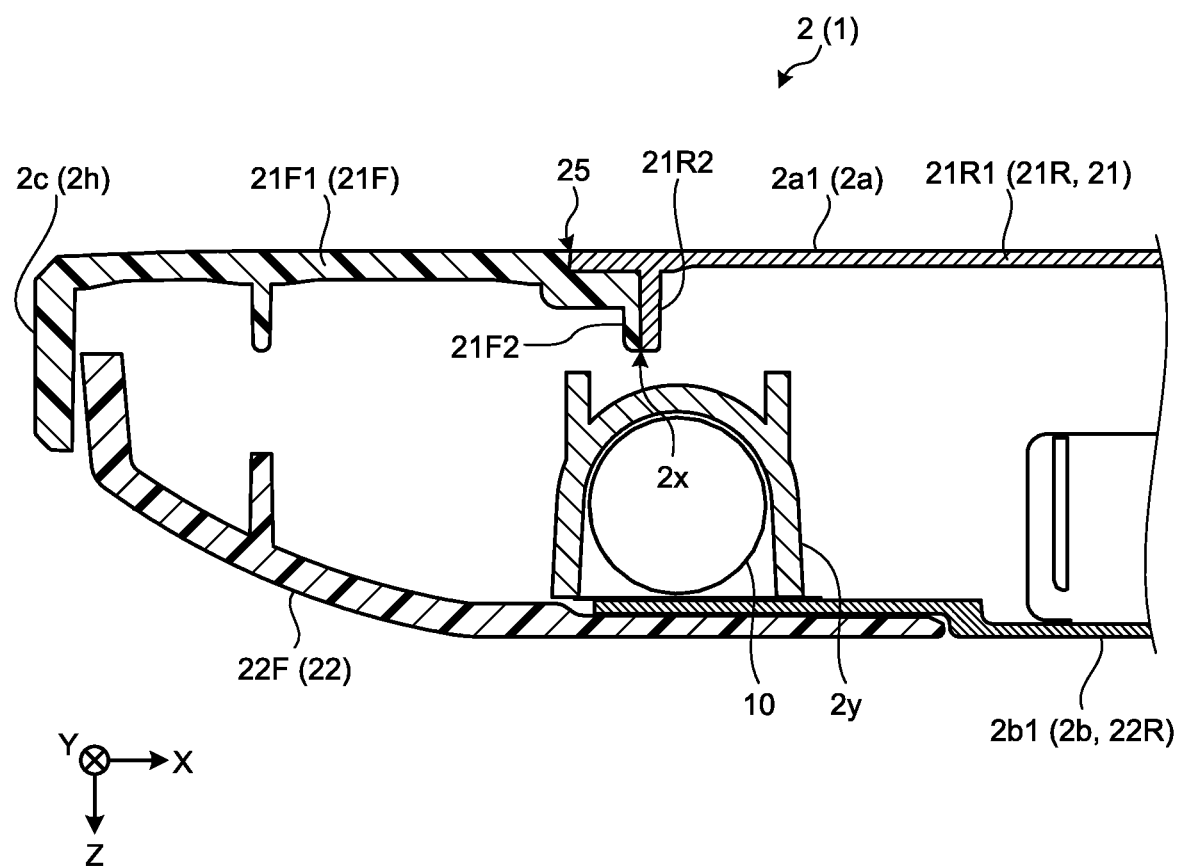
FIG. 9 is a cross-sectional view of the electronic device taken along a line IX-IX in FIG. 2.

Next, the rib 2x is described in detail. FIG. 6 is a perspective view of the back side of the top cover 21. FIG. 7 is an enlarged view of part of the first member 21F in FIG. 6. FIG. 8 is an enlarged view of part of the second member 21R in FIG. 6. FIG. 9 is a cross-sectional view of the electronic device 1 taken along a line IX-IX in FIG. 2.

As illustrated in FIG. 6, ribs 2x are located at positions corresponding to palm rests 8 of the base chassis 2. That is, the top wall 2a of the base chassis 2 is provided with two ribs 2x with spacing in the Y direction. The palm rests 8 are a part on which a user places his or her hands during use of the electronic device 1 with the display chassis 3 located at the first deployed position P1 (see FIG. 2). The palm rests 8 are also referred to as supports, for example.

As illustrated in FIG. 7, the first member 21F includes a first part 21F1 being part of the top wall 2a and the third part 21F2 being part of the rib 2x. The third part 21F2 projects from the X-directional end of the first part 21F1 in the Z direction, and extends in the Y direction.

The third part 21F2 is bent from both Y-directional ends in the direction opposite to the X direction, and connected to the front wall 2c (front end 2h). That is, the third part 21F2 includes parts extending in the X direction. Between the front wall 2c and the third part 21F2 a plurality of ribs different from the third part 21F2 is provided, projecting from the first part 21F1 in the Z direction. The ribs are arranged in a lattice form as viewed in the Z direction.

As illustrated in FIG. 8, the second member 21R includes a second part 21R1 being part of the top wall 2a, and the fourth part 21R2 being part of the rib 2x. The fourth part 21R2 projects in the Z direction from the end of the second part 21R1 in the direction opposite to the X direction, and extends along the third part 21F2. The fourth part 21R2 has a substantially U-shape that opens in the direction opposite to the X direction, as viewed in the Z direction.

As illustrated in FIG. 9, in one or more embodiments, the first member 21F and the second member 21R are joined together or integrated with each other while the second part 21R1 is aligned with the first part 21F1 in the X direction and the Y direction, and the fourth part 21R2 is aligned with the third part 21F2 in the X direction and the Y direction.

Thus, according to one or more embodiments, the third part 21F2 and the fourth part 21R2 of the rib 2x work to increase a contact area and a friction force in the boundary 25 between the first member 21F and the second member 21R. This can enhance the rigidity and strength of the top wall 2a against the load applied from the palm rests 8 in the Z direction being the projection direction of the ribs 2x, for example.

In one or more embodiments, either of the left wall 2d and the right wall 2f of the base chassis 2, for instance, the right wall 2f accommodates a touch pen 10. The touch pen 10 is covered with a partition wall 2y defining an accommodation space. The partition wall 2y has a substantially U-shape that opens towards the bottom wall 2b, as viewed in the Y direction. The partition wall 2y extends in the Y direction, and is aligned with the rib 2x in the Z direction. According to one or more embodiments, the partition wall 2y also works to improve the rigidity and strength of the bottom wall 2b against the load applied from the palm rests 8 in the Z direction.

As described heretofore, in one or more embodiments, the base chassis 2 includes the first member 21F made of a synthetic resin material (first material) including the top wall 2a (outer wall) having the front end 2h (first end), the ribs 2x that project into the base chassis 2 from a position away from the front end 2h of the top wall 2a in the X direction (first direction), and extends along the front end 2h, the first part 21F1 being part of the top wall 2a, and the third part 21F2 being part of each rib 2x; and the second member 21R made of a metallic material (second material) and joined to the first member 21F, the second member 21R including the second part 21R1 being part of the top wall 2a and aligned with the first part 21F1 in the X direction, and the fourth part 21R2 being part of each rib 2x and aligned with the third part 21F2 in the X direction.

With such a configuration, for example, the contact area and the friction force in the boundary 25 between the first member 21F and the second member 21R can be increased as compared with no ribs 2x provided. Consequently, the relatively simple structure including the ribs 2x can be, for example, improved in the joint strength of the boundary 25 between the first member 21F and the second member 21R, that is, the rigidity and the strength against the load applied in the Z direction being the projection direction of the ribs 2x.

Further, in one or more embodiments, the electronic device 1 includes the display chassis 3 (second chassis) including the display screen 6a and supported by the base chassis 2 to be rotatable about the rotational centers Ax1 and Ax2 between the closed position P0 (first position), in which the display screen 6a faces the top face 2a1 (outer face) of the top wall 2a, and the third deployed position P3 (second position), in which the display screen 6a faces oppositely to the top face 2a1; and the antennas 5a housed in the display chassis 3, and juxtaposed to the first member 21F in the Z direction (second direction) while the display chassis 3 is located at the third deployed position P3.

With such a configuration, owing to the first member 21F made of a synthetic resin material, during use of the electronic device 1 with the display chassis 3 situated at the third deployed position P3, for example, the antenna 5a can transmit and receive radio waves via the first member 21F.

First Modification

Figure 10:
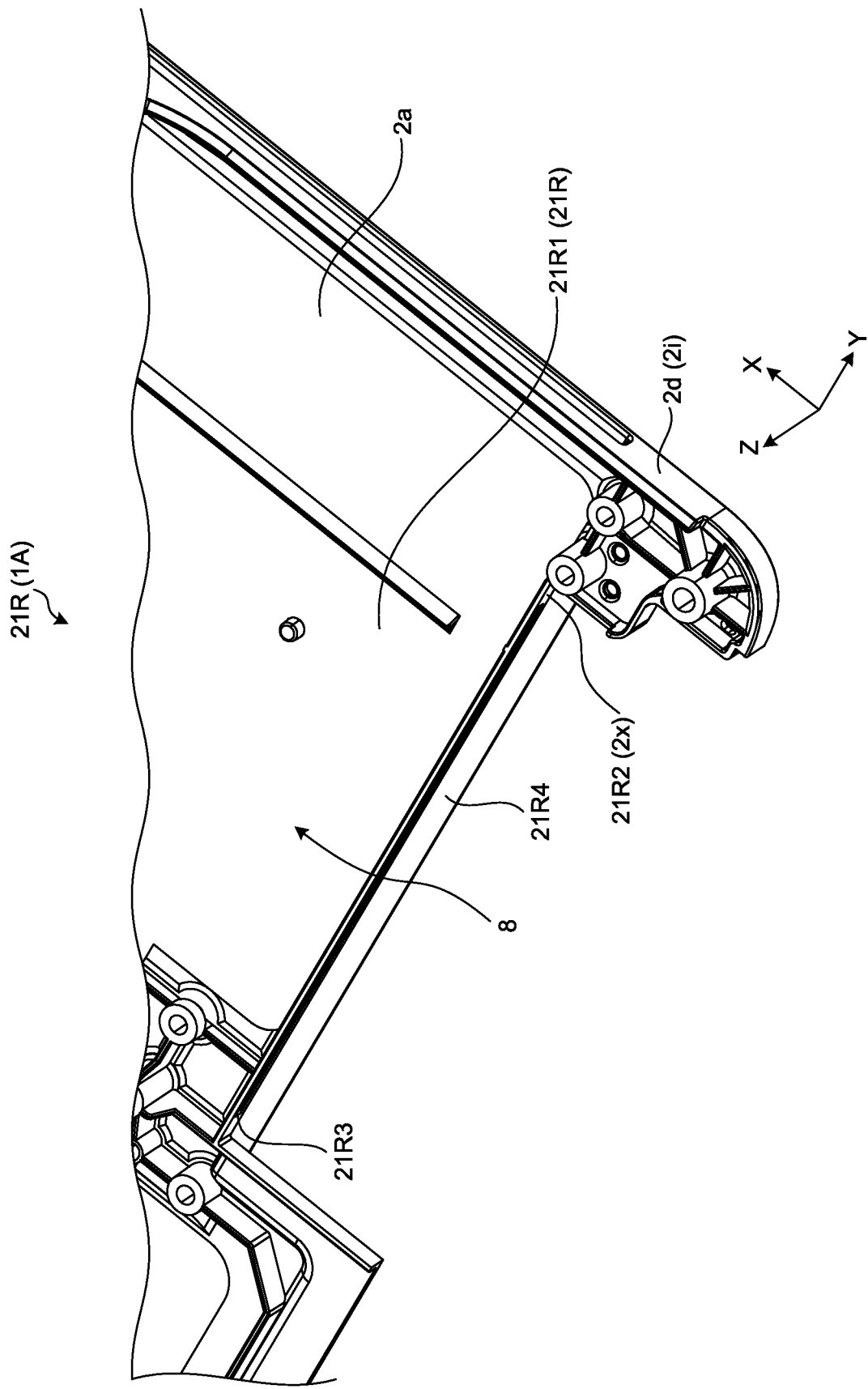
FIG. 10 is an exemplary perspective view of part of a second member of an electronic device according to a first modification of one or more embodiments.
Figure 11:
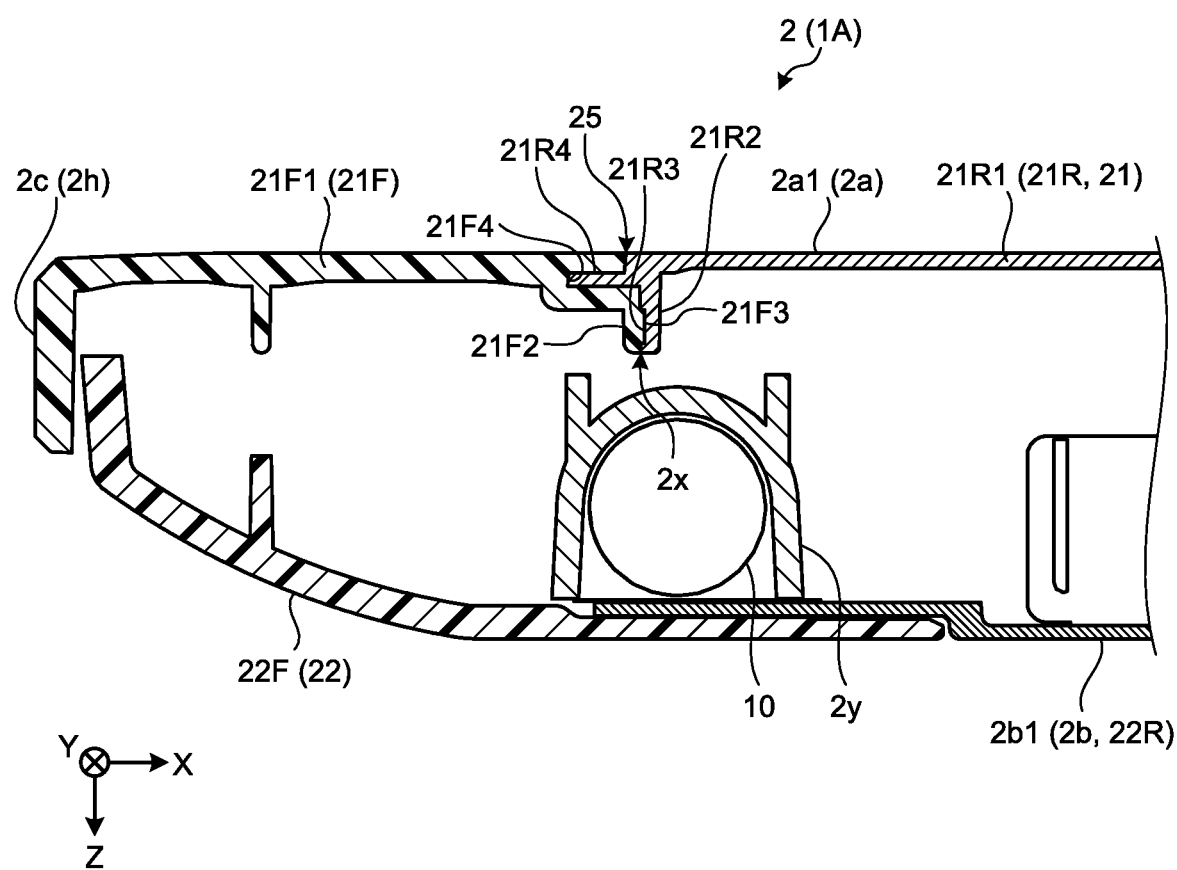
FIG. 11 is an exemplary cross-sectional view of part of a base chassis of the electronic device according to the first modification of one or more embodiments.

FIG. 10 is a perspective view of part of a second member 21R of an electronic device 1A according to a first modification. FIG. 11 is a cross-sectional view of part of a base chassis 2 of the electronic device 1A according to the first modification. The electronic device 1A has the same configuration as the electronic device 1 according to the above embodiments. Consequently, the electronic device 1A can attain the same or similar functions and effects based on the same configuration as the electronic device 1 of the above embodiments.

However, as illustrated in FIG. 10, the first modification differs from the above embodiments in that the fourth part 21R2 is provided with a recess 21R3. The recess 21R3 is, for example, recessed to be away from the third part 21F2, that is, in the X direction, and opens in the direction opposite the X direction. The recess 21R3 extends long in the Y direction along the fourth part 21R2. The recess 21R3 is not limited to this example, and may be, for example, intermittently formed in the Y direction.

As illustrated in FIG. 11, the third part 21F2 is provided with a projection 21F3 that projects in the X direction, and is inserted into the recess 21R3. The projection 21F3 extends along the recess 21R3 in the Y direction. That is, the projection 21F3 is engaged with or fitted in the recess 21R3. The projection 21F3 is an exemplary first projection, and the recess 21R3 is an exemplary first opening.

The first part 21F1 is provided with a recess 21F4 which is recessed oppositely to the second part 21R1. The second part 21R1 is provided with a projection 21R4 projecting into the recess 21F4. The projection 21R4 and the recess 21F4 are located apart from the top face 2a1 of the top wall 2a in the Z direction. The projection 21R4 extends in the Y direction, and is engaged with or fitted in the recess 21F4. The recess 21F4 is, for example, larger in depth than the recess 21R3 in the X direction. The projection 21R4 is an exemplary second projection, and the recess 21F4 is an exemplary second opening.

At the time of the insert molding of the first member 21F and the second member 21R, the projection 21F3 is formed by the synthetic resin material of the first member 21F entering into the recess 21R3. The recess 21F4 is also formed by the synthetic resin material of the first member 21F entering into the space around the projection 21R4 at the time of the insert molding of the first member 21F and the second member 21R. The recess 21R3 and the projection 21R4 are, for example, formed by partially cutting the fourth part 21R2 and the second part 21R1, respectively, by computerized numerical control (CNC) machining.

Thus, in the first modification, for example, the third part 21F2 is provided with the projection 21F3 extending in the X direction while the fourth part 21R2 is provided with the recess 21R3 into which the projection 21F3 enters. With such a configuration, for example, the contact between the projection 21F3 and the brim of the recess 21R3 can work to restrict the first member 21F and the second member 21R from moving relative to each other in the Z direction and the Y direction that intersect with the X direction. Further, in comparison with no projection 21F3 and no recess 21R3 provided, for example, it is possible to increase the contact area and the friction force in the boundary 25 between the first member 21F and the second member 21R. This can further enhance, for example, the joint strength of the first member 21F and second member 21R at the boundary 25.

In the first modification, for example, the second part 21R1 is provided with the projection 21R4 located away from the top face 2a1 of the top wall 2a in the Z direction and extending in the X direction, while the first part 21F1 is provided with the recess 21F4 into which the projection 21R4 enters. With such a configuration, for example, the contact between the projection 21R4 and the brim of the recess 21F4 can work to restrict the first member 21F and the second member 21R from moving relative to each other in the Z direction and the Y direction. This can further enhance, for example, the joint strength of the first member 21F and second member 21R at the boundary 25, that is, the rigidity and the strength against a load applied in the Z direction.

Second Modification

Figure 12:
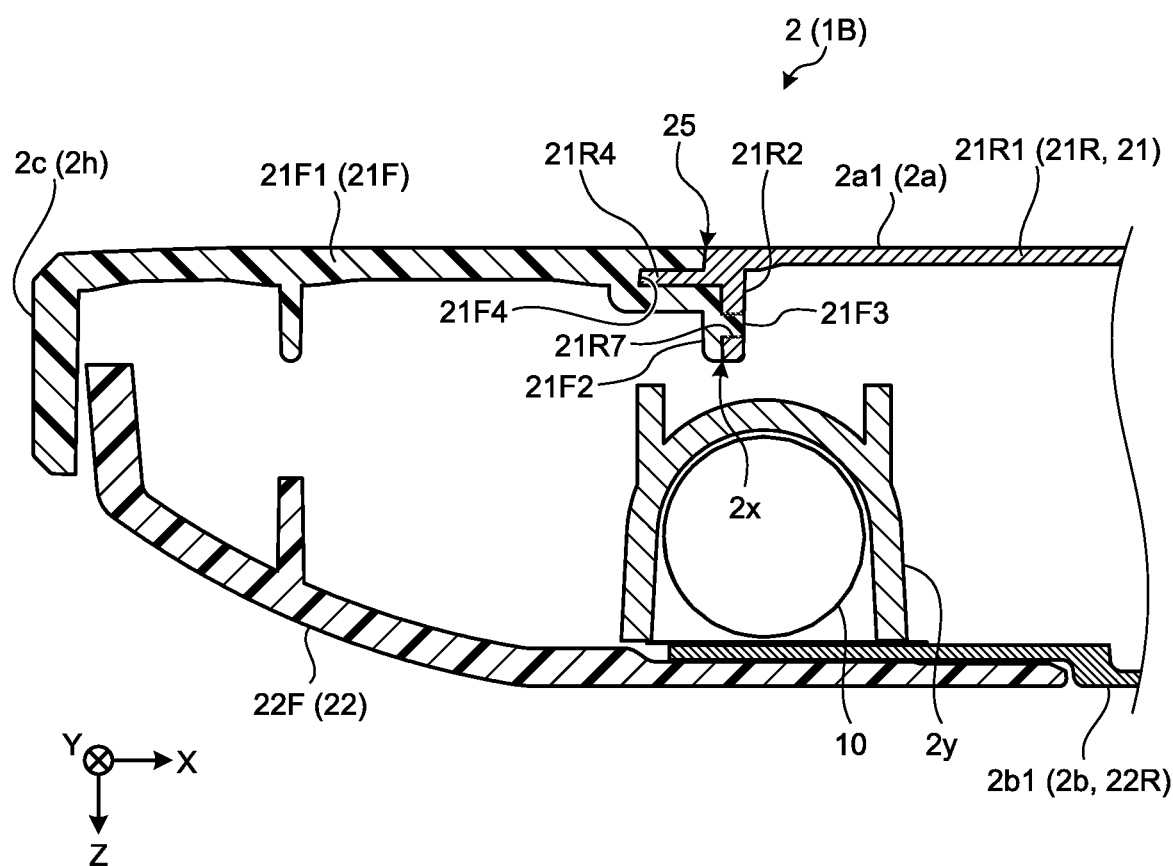
FIG. 12 is an exemplary cross-sectional view of part of a base chassis of an electronic device according to a second modification of one or more embodiments.

FIG. 12 is a cross-sectional view of part of a base chassis 2 of an electronic device 1B according to a second modification. The electronic device 1B has the same configuration as the electronic device 1A of the first modification. Consequently, the electronic device 1B can attain the same or like functions and effects based on the same configuration as the electronic device 1A of the first modification.

However, as illustrated in FIG. 12, the second modification differs from the first modification in that the fourth part 21R2 is additionally provided with a through hole 21R7. The through hole 21R7 is an exemplary first opening, and penetrates the fourth part 21R2 in the X direction. The projection 21F3 is engaged with or fitted in the through hole 21R7. The through hole 21R7 and the projection 21F3 may be, for example, intermittently formed in the Y direction.

As described above, according to the second modification, the through hole 21R7 serves to further increase the contact area or the amount of engagement with the projection 21F3, which can further enhance the joint strength of the boundary 25 between the first member 21F and the second member 21R, that is, the rigidity and the strength against the load applied in the Z direction.

The projection 21F3 is not limited to this example. Alternatively, the third part 21F2 may be provided with an overhang that extends over the through hole 21R7 on the opposite side of the third part 21F2 in the Z direction, for example. The overhang is also referred to as a flange, a hook, or a swaged part, for example. The overhang serves to increase the contact area between the first member 21F and the second member 21R, further enhancing the joint strength of the boundary 25 between the first member 21F and the second member 21R.

The overhang can be easily formed at the time of the insert molding of the first member 21F and the second member 21R by, for example, shifting the set position of the second member 21R with respect to a metal mold to ensure a space, around the side of the through hole 21R7 opposite the third part 21F2, into which the synthetic resin material of the first member 21F flows.

Third Modification

Figure 13:
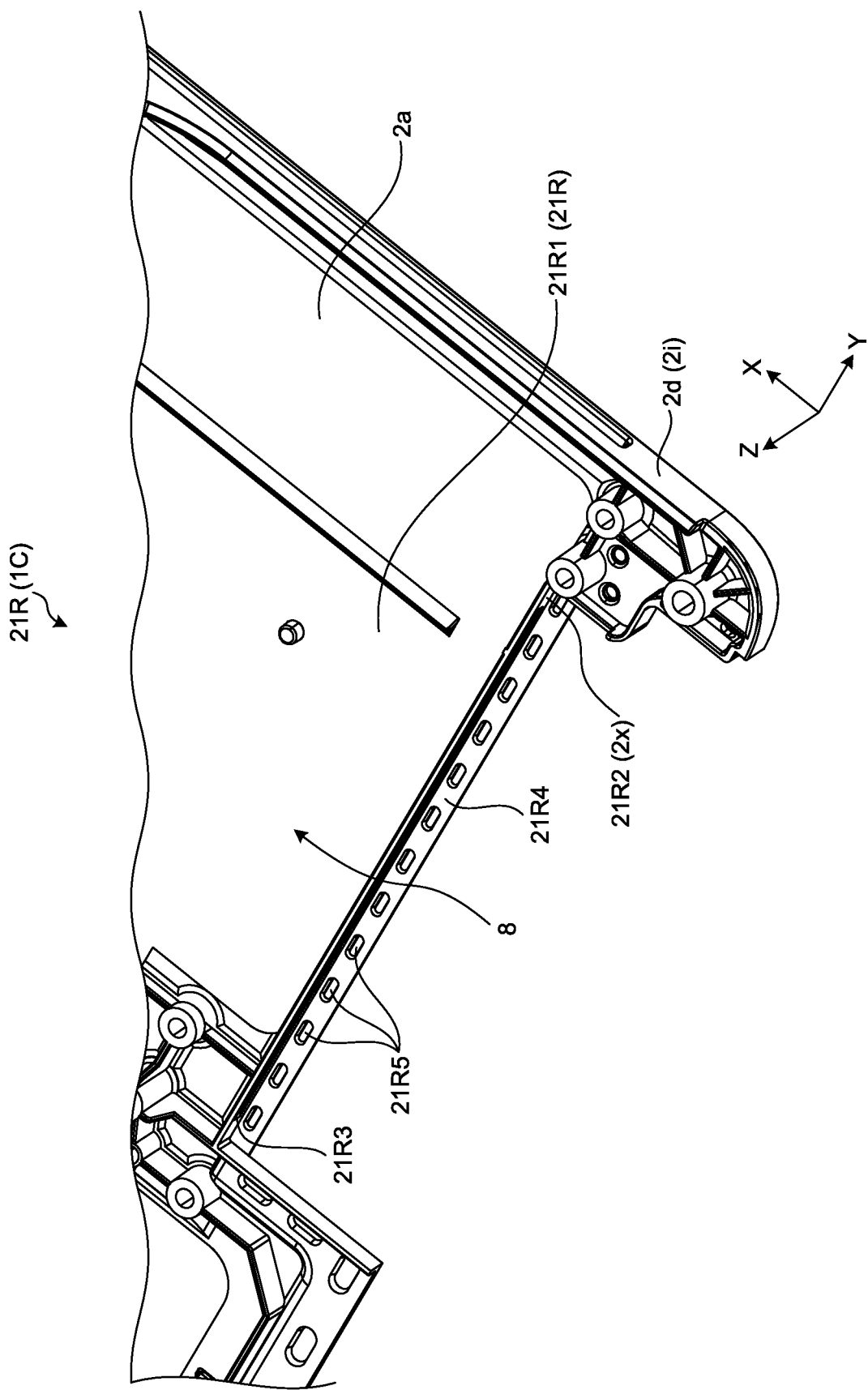
FIG. 13 is an exemplary perspective view of part of a second member of an electronic device according to a third modification of one or more embodiments.
Figure 14:
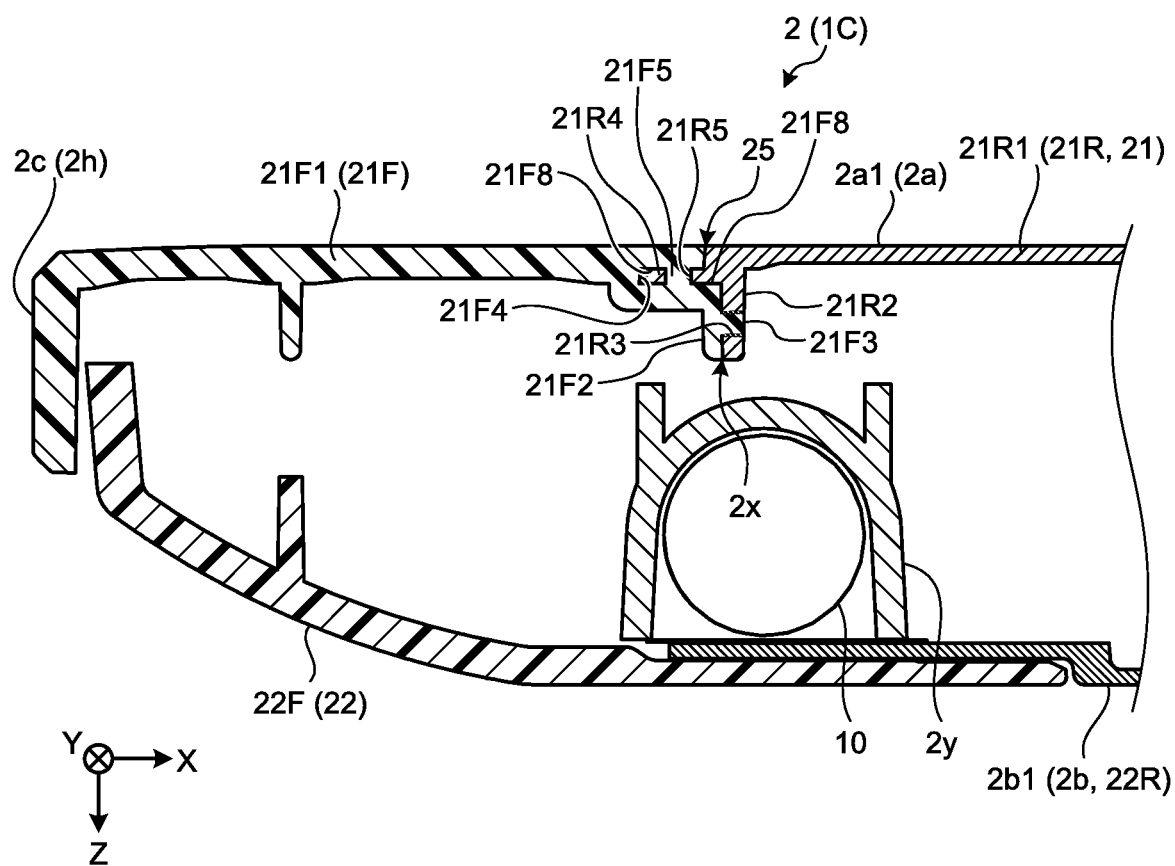
FIG. 14 is an exemplary cross-sectional view of part of a base chassis of the electronic device according to the third modification of one or more embodiments.

FIG. 13 is a perspective view of part of a second member 21R of an electronic device 1C according to a third modification, and FIG. 14 is a cross-sectional view of part of a base chassis 2 of the electronic device 1C according to the third modification. The electronic device 1C has the same configuration as the electronic device 1B according to the second modification. Consequently, the electronic device 1C can attain the same or like functions and effects based on the same configuration as the electronic device 1B of the second modification.

However, as illustrated in FIG. 13, the third modification differs from the first modification in that the projection 21R4 is provided with through holes 21R5. The through holes 21R5 are an exemplary through hole that passes through the projection 21R4 in the Z direction. The projection 21R4 is provided with the through holes 21R5 with spacing in the Y direction. The through holes 21R5 are not limited to this example, and may be, for example, an elongated hole that extends long in the Y direction.

As illustrated in FIG. 14, the first part 21F1 includes a connection 21F5 that connects to two side faces 21F8 of the recess 21F4 that are spaced apart from each other by way of the through hole 21R5 in the Z direction. The connection 21F5 extends between two side faces 21F8 in the Z direction. That is, the connection 21F5 is engaged with or fitted in the through hole 21R5.

Thus, according to the third modification, the connection 21F5, which passes through the through hole 21R5, connects the two side faces 21F8 of the recess 21F4. This can further enhance the joint strength of the boundary 25 between the first member 21F and the second member 21R, that is, the rigidity and the strength against the load applied in the Z direction.

According to one aspect of this disclosure, in comparison with no ribs provided, for example, the contact area and the friction force in the boundary between the first member and the second member can be increased. Consequently, the relatively simple structure including the ribs can be, for example, improved in the joint strength of the boundary between the first member and the second member, that is, the rigidity and the strength against the load applied in the second direction being the projecting direction of the rib.

According to one aspect of this disclosure, for example, the contact between the first projection and the brim of the first opening can work to restrict the first member and the second member from moving relative to each other in the direction intersecting the first direction. Further, as compared with no first projection and no first opening provided, for example, the contact area and the friction force in the boundary between the first member and the second member can be increased. Thus, it is possible to further enhance the joint strength of the boundary between the first member and the second member.

According to one aspect of this disclosure, for example, the contact between the second projection and the brim of the second opening can work to restrict the first member and the second member from moving relative to each other in the second direction intersecting the first direction. This can further enhance, for example, the joint strength of the first member and second member at the boundary, that is, the rigidity and the strength against a load applied in the second direction.

According to one aspect of this disclosure, for example, the connection connects to two side faces of the second opening, which can further enhance the joint strength of the first member and second member at the boundary.

According to one aspect of this disclosure, for example, the first member is made of a synthetic resin material, so that during use of the second chassis in the second position, the antenna can transmit and receive radio waves via the first member.

Thus, according to one aspect of this disclosure, it is made possible to provide a chassis for an electronic device with a novel structure that includes a first member and a second member made of mutually different materials and exerting an enhanced joint strength at the boundary, as well as an electronic device including such a chassis.

While certain embodiments have been described, these embodiments have been presented by way of example only, and are not intended to limit the scope of the inventions. Indeed, the novel methods and systems described herein may be embodied in a variety of other forms; various omissions, substitutions and changes in the form of the methods and systems described herein may be made without departing from the spirit of the inventions. The accompanying claims and their equivalents are intended to cover such forms or modifications as would fall within the scope and spirit of the inventions. Specifications including configurations and shapes (structures, kinds, directions, types, sizes, lengths, widths, thicknesses, heights, the number of components, arrangements, positions, materials, and the like) can be appropriately modified for implementation.

For example, the second material of the second member is not limited to a metallic material, and may be a synthetic resin material different from the first material of the first member.

What is claimed is:

1. A chassis for an electronic device, the chassis comprising:
    an outer wall having a first end;
    a rib that projects into the chassis from a position away from the first end of the outer wall in a first direction, and that extends along the first end;
    a first member made of a first material, the first member including:
        a first part that forms a part of the outer wall, and
        a third part that forms a part of the rib; and
    a second member made of a second material different from the first material and joined to the first member, the second member including:
        a second part that forms a part of the outer wall and is aligned with the first part in the first direction, and
        a fourth part that forms a part of the rib and is aligned with the third part in the first direction.

2. The chassis according to claim 1, wherein
one of the third part and the fourth part is provided with a first projection that extends in the first direction, and
the other of the third part and the fourth part is provided with a first opening into which the first projection enters.

3. The chassis according to claim 1, wherein
one of the first part and the second part is provided with a second projection that is located away from an outer face of the outer wall in a second direction and extends in the first direction, the second direction being a projecting direction of the rib, and
the other of the first part and the second part is provided with a second opening into which the second projection enters.

4. The chassis according to claim 3, wherein
the second projection is provided with a through hole passing through in the second direction, and
the other of the first part and the second part includes a connection that connects to two side faces of the second opening by way of the through hole, the two side faces being spaced apart from each other in the second direction.

5. An electronic device comprising:
    a first chassis comprising
        an outer wall having a first end;
        a rib that projects into the first chassis from a position away from the first end of the outer wall in a first direction, and that extends along the first end;
        a first member made of a first material, including a first part that forms a part of the outer wall, and a third part that forms a part of the rib; and
        a second member made of a second material different from the first material and joined to the first member, the second member including a second part that forms a part of the outer wall and is aligned with the first part in the first direction, and a fourth part that forms a part of the rib and is aligned with the third part in the first direction;
    a second chassis comprising a display screen, the second chassis being supported by the first chassis to be rotatable about a plurality of rotational centers between a first position and a second position, the first position being a position where the display screen faces the outer face of the outer wall, the second position being a position where the display screen faces oppositely to the outer face; and
    an antenna housed in the second chassis, the antenna being juxtaposed to the first member in a second direction while the second chassis is located at the second position, the second direction being a projecting direction of the rib, wherein
    the first material of the first member is a synthetic resin material.

* * * * *